(12) United States Patent
Pate et al.

(10) Patent No.: US 7,187,637 B2
(45) Date of Patent: Mar. 6, 2007

(54) OPTO-MECHANICAL ADJUSTMENT BASED ON SENSING LABEL SIDE OF OPTICAL DISC

(75) Inventors: Michael A. Pate, Corvallis, OR (US); Charles R. Weirauch, Loveland, CO (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 687 days.

(21) Appl. No.: 10/123,581

(22) Filed: Apr. 15, 2002

(65) Prior Publication Data

US 2003/0193864 A1 Oct. 16, 2003

(51) Int. Cl.
*G11B 7/125* (2006.01)

(52) U.S. Cl. ............... 369/53.21; 369/47.1; 369/47.5; 369/53.1; 347/251

(58) Field of Classification Search ............ 369/47.51, 369/47.12, 47.55, 30.04, 14, 84, 125, 30.27, 369/52.1, 53.21, 124.01, 275.3, 53.15, 53.35, 369/278, 288, 47.5, 47.1, 53.1, 59.1, 30.1, 369/30.4; 347/224, 2, 12, 37, 38, 232, 252, 347/251; 156/378; 358/1.7, 1.11, 1.15, 358/1.18, 1.5, 1.2; 400/61; 428/72; 101/35, 101/486; 283/81

See application file for complete search history.

(56) References Cited

U.S. PATENT DOCUMENTS

| | | | | |
|---|---|---|---|---|
| 4,677,604 A * | 6/1987 | Selby et al. | ............ | 369/30.27 |
| 4,814,799 A * | 3/1989 | Lu | ............ | 347/241 |
| 4,889,979 A * | 12/1989 | Drexler et al. | ............ | 369/53.15 |
| 4,900,598 A * | 2/1990 | Suzuki | ............ | 369/288 |
| 4,954,380 A * | 9/1990 | Kanome et al. | ............ | 369/278 |
| 5,289,451 A * | 2/1994 | Ashinuma et al. | ............ | 369/47.55 |
| 5,854,175 A * | 12/1998 | DeBoer et al. | ............ | 428/172 |
| 5,915,858 A * | 6/1999 | Wen | ............ | 400/61 |
| 5,927,208 A * | 7/1999 | Hagstrom et al. | ............ | 101/486 |
| 5,946,286 A * | 8/1999 | Bahns | ............ | 369/275.3 |
| 5,967,676 A * | 10/1999 | Cutler et al. | ............ | 400/70 |
| 5,978,321 A * | 11/1999 | Tsuneyoshi | ............ | 369/14 |
| 6,019,151 A * | 2/2000 | Wen et al. | ............ | 156/387 |
| 6,020,977 A * | 2/2000 | Kim | ............ | 358/1.7 |
| 6,052,347 A | 4/2000 | Miyata | ............ | 369/54 |
| 6,074,031 A * | 6/2000 | Kahle | ............ | 347/4 |
| 6,083,667 A * | 7/2000 | Nishizawa et al. | ............ | 369/275.3 |
| 6,109,324 A * | 8/2000 | Bugner et al. | ............ | 156/378 |
| 6,202,550 B1 * | 3/2001 | Lee et al. | ............ | 101/38.1 |
| 6,246,041 B1 | 6/2001 | Nakayama et al. | ............ | 250/201.5 |
| 6,264,295 B1 * | 7/2001 | Bradshaw et al. | ............ | 347/2 |
| 6,384,929 B1 * | 5/2002 | Miller | ............ | 358/1.15 |
| 6,386,667 B1 * | 5/2002 | Cariffe | ............ | 347/12 |
| 6,771,297 B2 * | 8/2004 | Bronson | ............ | 369/30.04 |
| 6,778,205 B2 * | 8/2004 | Anderson et al. | ............ | 347/251 |
| 6,801,487 B2 * | 10/2004 | Anderson | ............ | 369/47.12 |
| 2001/0026531 A1 * | 10/2001 | Onodera et al. | ............ | 369/284 |

FOREIGN PATENT DOCUMENTS

EP 1 081 696 3/2001

* cited by examiner

*Primary Examiner*—Andrea Wellington
*Assistant Examiner*—Kim-Kwok Chu

(57) ABSTRACT

Opto-mechanical adjustment based on sensing the label side of an optical disc is disclosed. The label side of the optical disc is first sensed with an opto-mechanical system. The opto-mechanical system is then adjusted, based on the label side of the optical disc as sensed, for future writing on the label side of the optical disc.

35 Claims, 6 Drawing Sheets

OPTO-MECHANICAL ADJUSTMENT BASED ON SENSING LABEL SIDE OF OPTICAL DISC

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used. However, this is a laborious process: the labels must be carefully aligned on the discs, and so on. Special-purpose printers that print directly on the discs can be used, but such printers are fairly expensive.

In the patent application entitled "Integrated CD/DVD Recording and Label" [attorney docket 10011728-1], filed on Oct. 11, 2001, and assigned Ser. No. 09/976,877, a solution to these difficulties is described, in which a laser is used to label optical discs. However, as a laser ages, it tends to lose its ability to write a given sized mark on the label side of an optical disc at a given level of power applied to the laser. Dust or other opaque or light scattering materials may accumulate on the optical system's lens(es), also affecting its ability to write a mark on the disc's label side at a given level of power.

Furthermore, the material used for the label side of an optical disc can vary in photosensitivity, reflectivity, color, as well as in other properties from one type of optical disc to another type of optical disc. Even for discs of the same type, manufacturing variations can cause variations in these or other optical properties from disc to disc, and can even cause variations within a given optical disc. Any or all of these reasons may affect the resulting quality of optical disc labeling using a laser.

SUMMARY OF THE INVENTION

A method of one embodiment of the invention senses a label side of an optical disc with an opto-mechanical system. The opto-mechanical system is then adjusted based on the label side of the optical disc, as sensed, for future writing on the label side of the optical disc.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, optical, opto-mechanical, and other changes may be made without departing from the spirit or scope of the present invention. The following detailed description is, therefore, not to be taken in a limiting sense, and the scope of the present invention is defined only by the appended claims.

Overview

Figure 1:
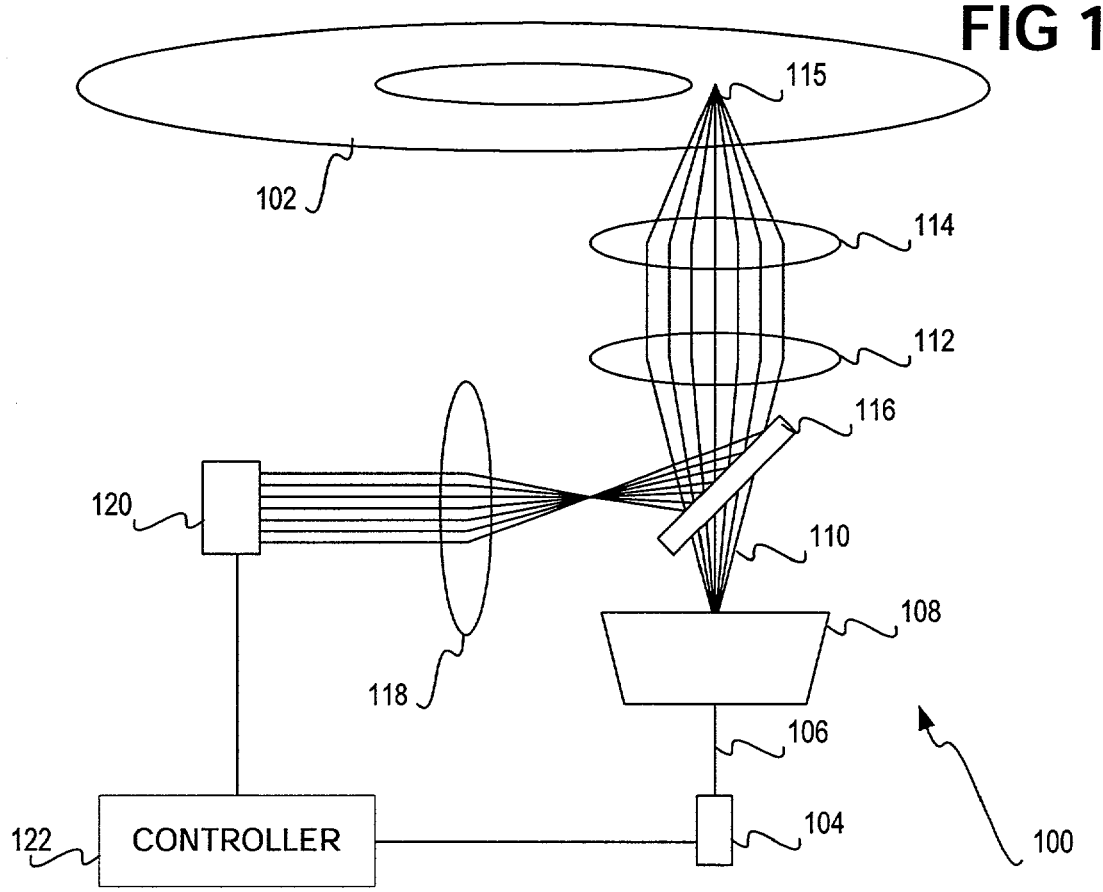
FIG. 1 is a diagram of a system according to an embodiment of the invention.

FIG. 1 shows an opto-mechanical system 100 according to an embodiment of the invention. The system 100 is used for reading and writing to the label side of an optical disc 102. A laser diode 104 outputs a laser 106 that a diffraction grating 108 separates into a number of laser beams 110. Separation of the laser 106 into the laser beams 110 can be accomplished by using other mechanisms than diffraction with the grating 108, such as with reflection as in a beam splitter, which is amplitude splitting, refraction such as with a beam that is incident upon the vertex of a prism, or scatter. The laser beams 110 pass through a collimator lens 112 to collimate the beams 110, and then through an objective lens 114 to focus the laser beams 110 onto a number of tracks of the label side of the optical disc 102, as indicated by the reference number 115.

The tracks of the label side of the optical disc 102 reflect the laser beams 110, which are directed through the objective lens 114 to the beam splitter 116 and then towards the lens 118. The lens 118 collimates the laser beams 110 once again, onto the multi-beam detector array 120. There is preferably an individual detector within the array 120 for each of the beams 110. The detector array 120 thus senses the beams 110 as they are reflected off the label side of the optical disc 102. A controller 122, which can be implemented in hardware, software, or both hardware and software, adjusts the laser 106 output by the laser diode 104 based on the sensing of the beams 110 by the array 120.

The laser beams 110 may serve a number of different purposes. When separated from a high power laser 106, the beams 110 can be used to write to the label side of the optical disc 102. When separated from a lower-power laser 106, the beams 110 can be used to read from the label side of the optical disc 102. Such reading may include the sensing of the label side of the optical disc 102 that has been described.

Changes to the system 100 can also be made without departing from the spirit or scope of the invention. For instance, in one embodiment, a physical and/or optical ninety-degree rotation of the multi-beam detector array 120 may be accomplished. Thus, the detector array 120 is perpendicular to the tangential direction of the spinning optical disc 102 in this embodiment. As another example, the multi-beam detector array 120 may be physically or optically rotated more or less than ninety degrees, for optimizing image quality, light-media interaction calibration (LMIC), or other aspects and attributes of the system 100.

Figure 2:
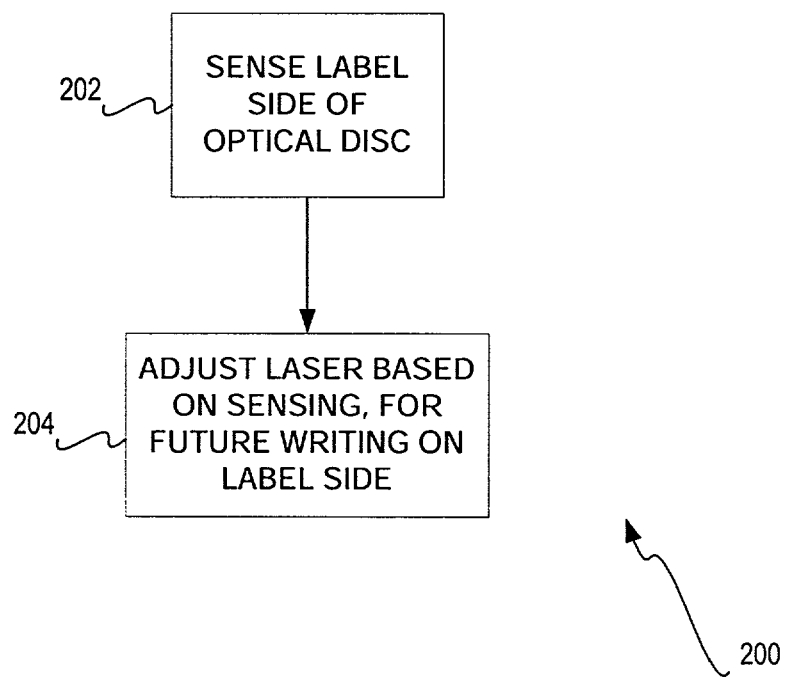
FIG. 2 is a flowchart of a method according to an embodiment of the invention.

FIG. 2 shows an overall method 200 according to an embodiment of the invention, and that can be performed in conjunction with the system 100 of FIG. 1. First, the label side of an optical disc is sensed (202). Such sensing can include sensing the reflectivity of the label media of the disc, the contrast of the label side, the label side gray level, and the linearity of the response of the label side to one or more laser beams. Where the laser was previously used to write a spot or mark to the label side of the optical disc, the sensing may also detect the size and/or shape of this mark. Based on these properties sensed, the opto-mechanical system, such as the laser thereof, is adjusted (204), for future writing on the label side of the optical disc. For instance, either the power, the exposure time, or the focus of the laser may be adjusted. The axial position of the focus of the laser is adjusted in the sense that the size of the spot on the disc label surface, such as the spot's diameter, is adjusted.

Sensing the label side of the optical disc allows the opto-mechanics to be adjusted so that more optimal laser writing to the label side of the optical disc can occur. This sensing and laser adjustment based thereon can be a closed loop laser control to accommodate variations in the optical disc substrate or labeling media being used, as well as to accommodate variations in the laser itself. As a result, more accurate and higher quality laser/media interaction to the label side of the optical disc occurs.

Dynamic Light-media Interaction Calibration (DLMIC)

Figure 3:
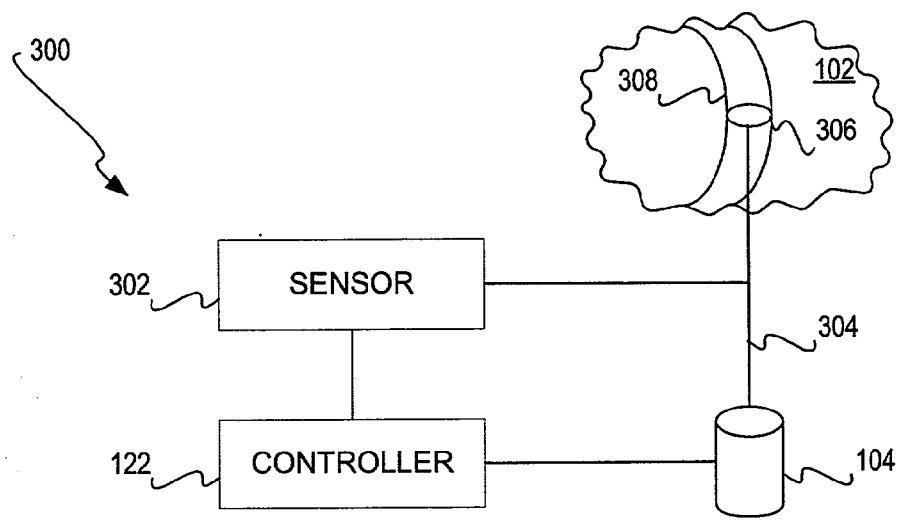
FIG. 3 is a diagram showing a system in which a central beam of a laser is used for label side sensing of an optical disc, according to an embodiment of the invention.

FIG. 3 shows an opto-mechanical system 300 according to an embodiment of the invention that performs DLMIC of the laser used for writing to and reading from the label side of an optical disc. The system 300 is in one embodiment based on and consistent with the system 100 of FIG. 1, but does not include all the components shown in the system 100 of FIG. 1 for illustrative clarity. The laser diode 104 outputs a laser that includes a central beam 304. The laser may be separated into additional beams besides the central beam 304, but only the central beam 304 is shown in FIG. 3. The central beam 304 may be considered the primary beam of the laser, used for reading from and writing to the label side of the optical disc 102, a portion of which is shown in FIG. 3.

The central beam 304 specifically illuminates a spot 306 on a track 308 of the label side of the optical disc 102 to which the beam 304 is incident. The track 308 is explicitly shown in FIG. 3, but in actuality may not be explicitly demarcated. The track 308 is a concentric ring or continuous spiral of the optical disc 102. As the optical disc 102 rotates and the laser diode 104 is not moved, all positions within the track 308 will ultimately be illuminated by the central beam 304. As the laser diode 104 is moved radially, the central beam 304 of the laser can illuminate all positions within all the tracks of the optical disc 102, as the disc 102 rotates.

The central beam 304 is reflected off the spot 306, and as reflected is sensed by the sensor 302, potentially using a beam splitter not shown in FIG. 3. The sensor 302 is specifically an auto-focus sensor, as it is the sensor otherwise used to ensure that the central beam 304 is properly focused on the label side of the optical disc 102 for writing or reading purposes. The sensor 302 may be part of the multi-beam detector array 120 of FIG. 1. The sensing by the sensor 302 may sense one or more of the properties previously indicated. Based on this sensing, the controller 122 adjusts the power and/or the exposure time, or focus of the laser output by the laser diode 104.

The process of sensing by the sensor 302 and adjusting the power and focus of the laser by the controller 122 is considered dynamic light-media interaction calibration (DLMIC), where the sensor 302 and/or the controller 122 can be considered the means for performing such DLMIC. This is because as the central beam 304 is used to write to or read from the track 308 of the label side of the optical disc 102, sensing by the auto-focus sensor 302 concurrently occurs. Thus, as the central beam 304 writes to or reads from the track 308, the controller 122 can adjust the laser output by the laser diode 104 in a running manner. Variations within the optical disc media, for instance, can be detected as the central laser beam 304 writes to the label side of the optical disc 102, so that the laser power and/or opto-mechanical system can be adjusted in essentially real-time for these variations.

Figure 4:
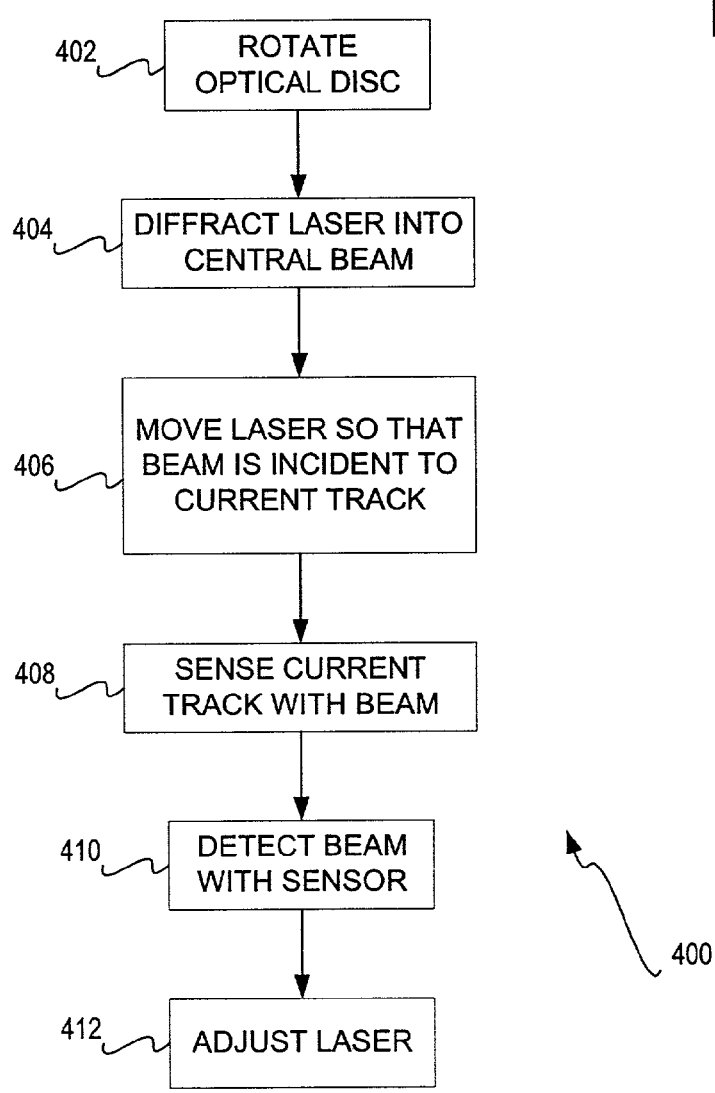
FIG. 4 is a flowchart of a method for running light-media interaction calibration (RLMIC) of a laser for label side writing of an optical disc, according to an embodiment of the invention.

FIG. 4 shows a method 400 for performing DLMIC according to an embodiment of the invention, and that can be performed in conjunction with the system 300 of FIG. 3. The method 400 may be implemented as a computer program stored on a computer-readable medium. First, an optical disc is rotated (402). A laser is separated into at least a central laser beam (404), and the sled controlling positioning of the laser is moved so that the central beam is incident to a desired current track on the label side of the rotating optical disc (406). The central beam is also responsible for writing to the label side of the optical disc. The current track is sensed with the central beam (408), where the central beam as reflected off the current track is detected with an auto-focus sensor (410). The laser is then adjusted (412), based on the sensing of the current track by the central beam, as detected by the auto-focus sensor. Thus, the label side of the optical disc may be sensed as the laser writes to the label side of the optical disc, in a dynamic or real-time manner.

Light-media Interaction Calibration (LMIC)

Figure 5:
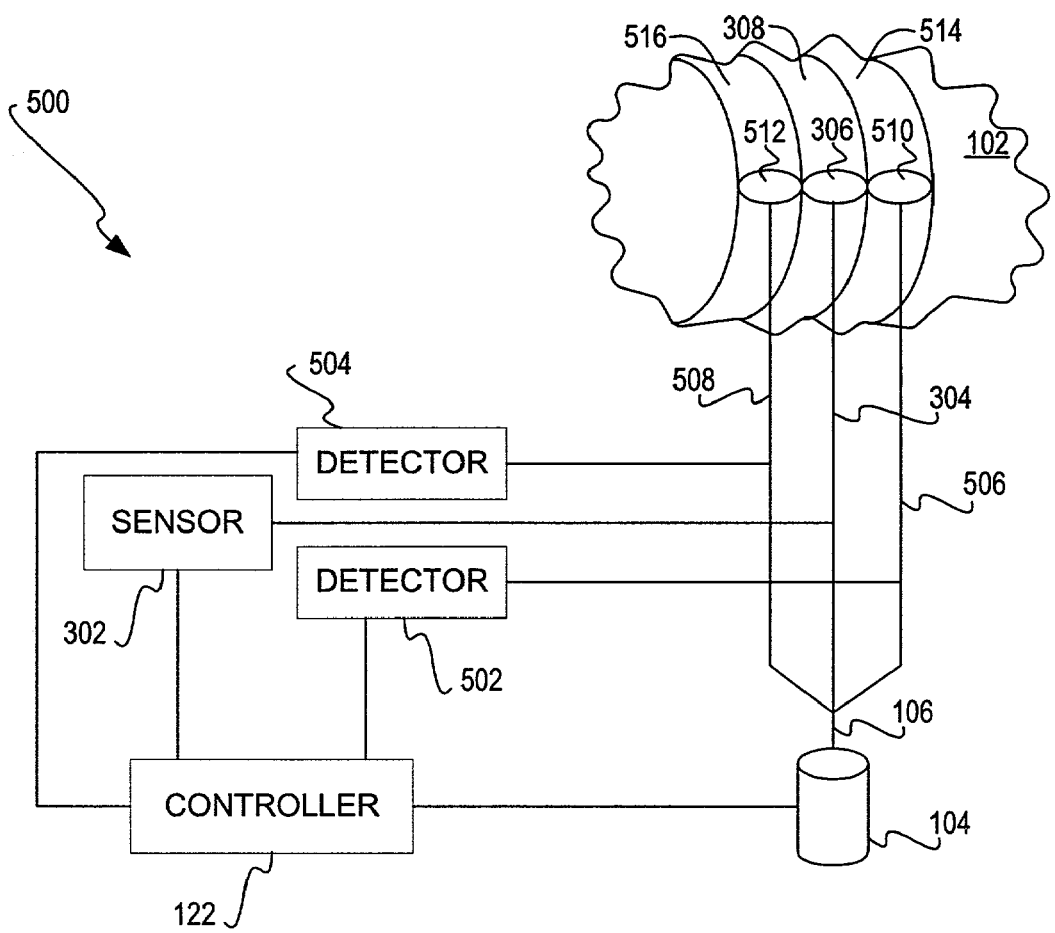
FIG. 5 is a diagram showing a system in which a satellite beam of a laser is used for label side sensing of an optical disc, according to an embodiment of the invention.

FIG. 5 shows an opto-mechanical system 500 according to an embodiment of the invention that performs LMIC of the laser used for writing to and reading from the label side of an optical disc. The system 500 is in one embodiment based on and consistent with the system 100 of FIG. 1, but does not include all the components shown in the system 100 of FIG. 1 for illustrative clarity. Furthermore, the system 500 may be implemented concurrently with the system 300 of FIG. 3 that has been described.

The laser diode 104 outputs the laser 106 that is separated into at least the central laser beam 304, and satellite laser beams 506 and 508. The laser diode 104, and hence the laser 106 is part of an opto-mechanical sub-system of the system 500. The laser 106 may be separated into additional beams besides the beams 304, 506, and 508, but only these three beams are shown in FIG. 5. The central beam 304 may be considered the primary beam of the laser, used for reading from and writing to the label side of the optical disc 102, a portion of which is shown in FIG. 5.

The central beam 304 specifically illuminates a spot 306 on a current track 308 of the label side of the optical disc 102 to which the beam 304 is incident. Because the laser diode 104 is typically moved from the interior to the exterior of the optical disc 102, the satellite beam 508 illuminates a spot 512 on a previous track 516 of the label side of the disc 102. Similarly, the satellite beam 506 illuminates a spot 510 on a subsequent track 514 of the label side of the disc 102.

The tracks 308, 516, and 514 are explicitly shown in FIG. 5, but in actuality may not be explicitly demarcated. The tracks 308, 516, and 514 are concentric rings or the previous sections of a continuous spiral of the optical disc 102. As the laser diode 104 is moved radially, the track illuminated by the beam 506 is next illuminated by the beam 304, and finally by the beam 508. Thus, the illumination of tracks shown in FIG. 5 means that the central beam 304 currently illuminates the track 308, but previously illuminated the track 516. Furthermore, the track 514 currently illuminated by the beam 506 will next be illuminated by the central beam 304.

The central beam 304 is reflected off the spot 306, and the satellite beams 506 and 508 are reflected off the spots 510 and 512, respectively. The central beam 304 as reflected is sensed by the auto-focus sensor 302, whereas the satellite beams 506 and 508 as reflected are sensed by the satellite detectors 502 and 504, respectively. The sensor 302 and the detectors 502 and 504 may be part of the multi-beam detector array 120 of FIG. 1. The sensing by the sensor 302 and the detectors 502 and 504 may sense one or more of the properties previously indicated. Based on this sensing, the controller 122 adjusts the power, the exposure time of the laser 106 output by the laser diode 104, or the focus spot diameter of the beam on the media by way of the opto-mechanical sub-system. The latter can also be considered adjusting the focus of the laser 106.

The satellite beam 508 that is incident to the previous track 516 to the current track 308 to which the central beam 304 is incident is particularly used by the controller 122 to adjust the laser 106 output by the laser diode 104 or the focus spot size. First, when the central beam 304 is located over the track 516, it writes a mark, such as a spot. The central beam 304 then moves over to the track 308, such that the satellite beam 508 is located over the track 516. The satellite beam 508, on a one track-later basis, senses the mark previously written by the central beam 304 on the track 516. The size, shape and/or reflectivity of this mark is sensed by the beam 508, which is detected by the detector 504. The controller 122 can thus adjust the laser 106 output by the laser diode 104 based on the sensing of the mark.

This process of sensing by the detector 504 in particular, and adjusting the power of the laser by the controller 122, is considered light-media interaction calibration (LMIC), where the detector 504 and/or the controller 122 can be considered the means for performing such LMIC. The process is considered LMIC, and not dynamic LMIC (DLMIC), because the sensing by satellite beam 508 that is detected by the detector 504 occurs one track after the central beam 304 has written to a given track. That is, the detection by the detector 504 does not occur concurrently with the central beam 304 writing to the optical disc 102, but rather occurs on a one track-later basis. The advantage of LMIC, however, is that unlike DLMIC in at least some embodiments, LMIC can sense a mark that has been written to the label side of the optical disc, and not just the unwritten label side itself.

Figure 6:
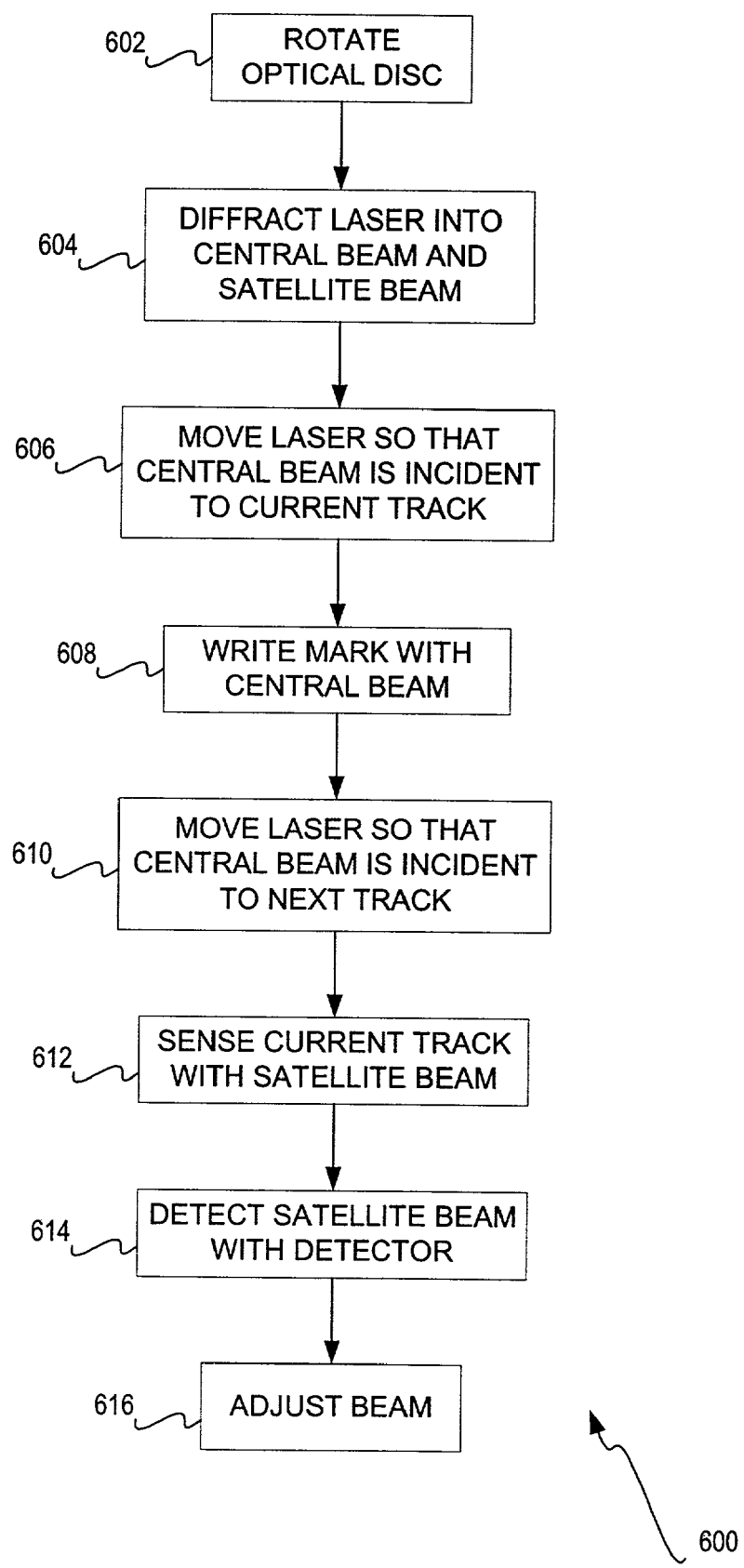
FIG. 6 is a flowchart of a method for light-media interaction calibration (LMIC) of a laser for label side writing of an optical disc, according to an embodiment of the invention.

FIG. 6 shows a method 600 for performing LMIC according to an embodiment of the invention, and that can be performed in conjunction with the system 500 of FIG. 5. The method 600 may be implemented as a computer program stored on a computer-readable medium. First, an optical disc is rotated (602), and a laser is separated into at least a central laser beam and a satellite laser beam (604). The laser is moved so that the central beam is incident to a desired current track on the label side of the rotating optical disc (606). The central beam is then used to write a mark, such as a spot, on this current track (608).

Next, the laser is moved so that the central beam is incident to the next track (610), such that the satellite beam is incident to the desired current track on which a mark was written with the central beam. The mark on the current track is sensed with the satellite beam (612), where the satellite beam as reflected off the mark on the current track is detected with a satellite detector (614). The laser is then adjusted (616), based on the satellite beam's sensing of the mark written on the current track by the central beam, as detected by the satellite detector.

Example Systems

Figure 7:
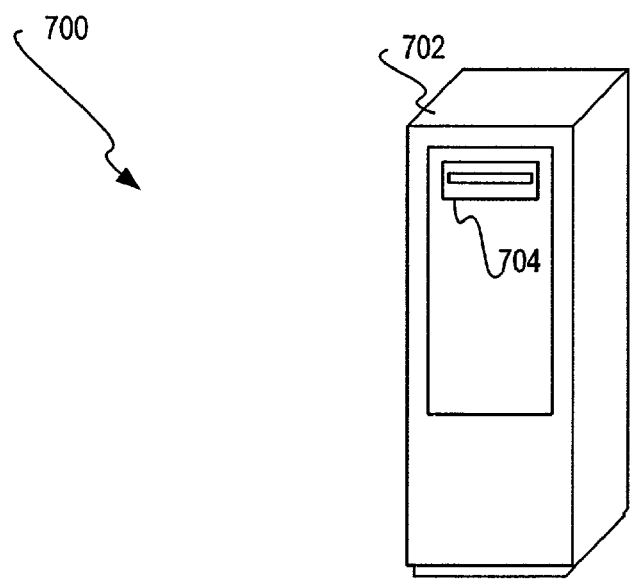
FIG. 7 is a diagram showing how an embodiment of the invention can be internally adapted to a computer.
Figure 8:
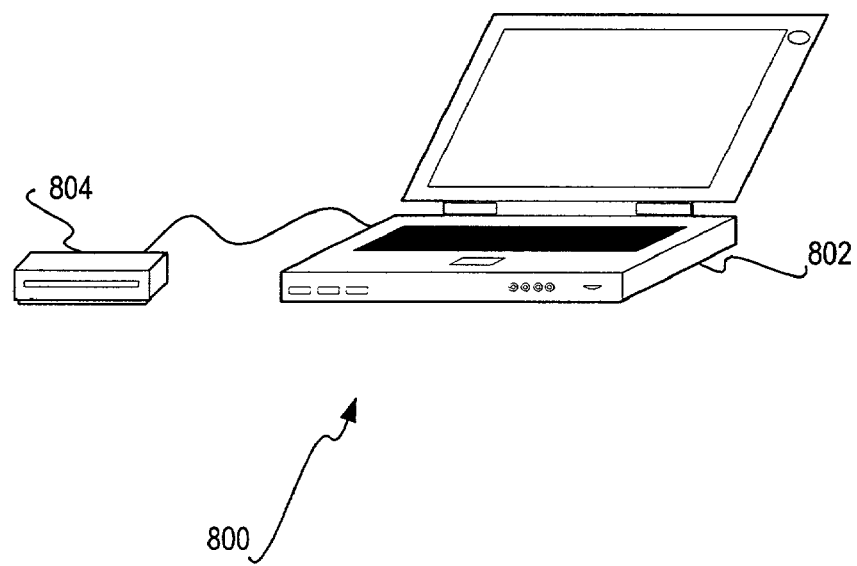
FIG. 8 is a diagram showing how an embodiment of the invention can be externally adapted to a computer.

The systems of embodiments of the invention that have been described may be part of a computer, such as a desktop or laptop computer. The systems may also be encased in an enclosure internally or externally connectable to a computer. FIG. 7 shows a system 700 according to an embodiment of the invention that includes a desktop tower computer 702 in which the system 100 of FIG. 1, the system 300 of FIG. 3, or the system 500 of FIG. 5 is indicated as the system 704 and is encased in an enclosure that has been internally connected to the computer 702. By comparison, FIG. 8 shows a system 800 according to an embodiment of the invention that includes a laptop computer 802 in which the system 100 of FIG. 1, the system 300 of FIG. 3, or the system 500 of FIG. 5 is indicated as the system 804 and is enclosed in an enclosure that has been externally connected to the computer 802. Whereas the computer 802 is depicted in FIG. 8 as a laptop computer, it may also be a desktop computer, or another type of computer. Furthermore, systems of the embodiment may be implemented in conjunction with other types of electronics equipment, such as home stereo equipment, portable stereo equipment, and so on.

Computer Program

Figure 9:
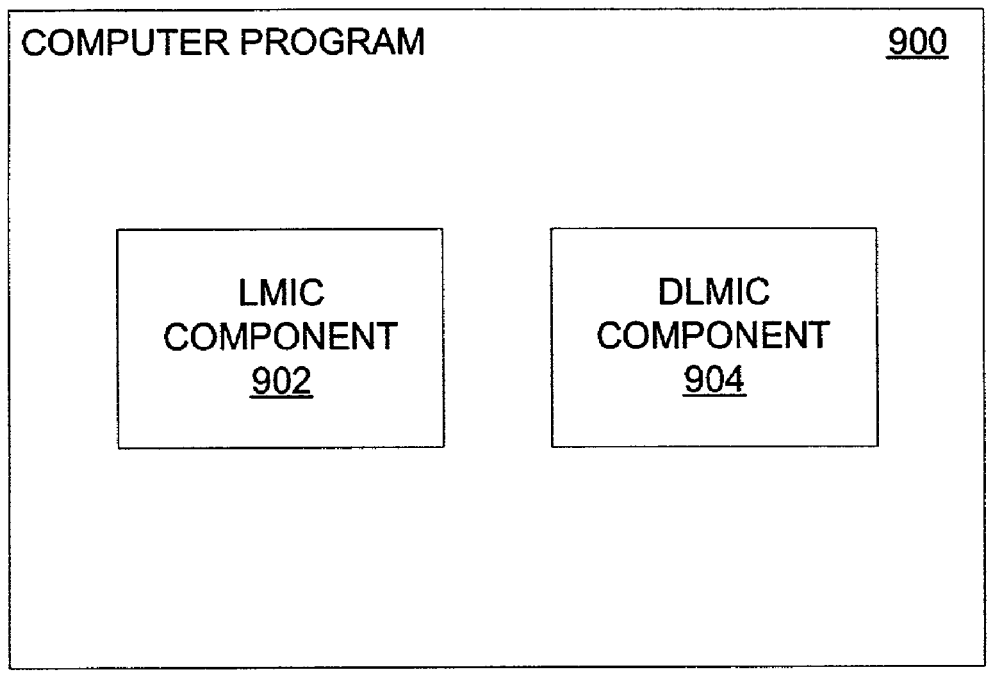
FIG. 9 is a diagram of a computer program according to an embodiment of the invention.

FIG. 9 shows a computer program 900 according to an embodiment of the invention. The methods and the systems that have been described can be implemented in conjunction with the computer program 900. Furthermore, the computer program 900 resides within the controller 122 of FIGS. 1, 3, and 5. The computer program 900 may be stored on a computer-readable medium, such as a floppy disk, an optical disc, and so on.

The computer program 900 is depicted in FIG. 900 as including two components 902 and 904. Each of these components may be implemented as a separate set of computer-executable instructions, module, set of routines, and so on. However, the components are discretely shown in FIG. 9 for illustrative clarity. Therefore, their individual functionality may be combined into one or more other components, or distributed among a different set of components as well. Each component may also be considered the means for performing its respective functionality.

The LMIC component 902 is for performing light-media interaction calibration (LMIC). As has been described, the LMIC senses a mark one track after the mark has been laser-written to the label side of an optical disc. The DLMIC component 904 is for performing dynamic LMIC (DLMIC). As has also been described, the DLMIC senses a current track of the label disc of an optical disc, as the current track is laser-written to. Based on the sensing performed by the components 902 and 904, the applied power and/or exposure time of the laser used for label side writing is adjusted.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A method comprising:
    laser-writing a mark on a current track of a label side of an optical disc using a first laser beam of an opto-mechanical system illuminating the current track;
    measuring one or more properties of the label side of the optical disc with the opto-mechanical system, including sensing the mark one track later after laser-writing the mark, using a second laser beam of the opto-mechanical system that illuminates a previous track to the current track illuminated by the first laser beam, and measuring at least one of: label side reflectivity; label side contrast; label side gray level; label side response linearity; written mark spot size; and, written mark spot shape; and,
    adjusting the opto-mechanical system based on the properties of the label side of the optical disc as measured for future writing on the label side of the optical disc.

2. The method of claim 1, wherein measuring the one or more properties of the label side of the optical disc with the opto-mechanical system comprises employing light-media interaction calibration (LMIC).

3. The method of claim 1, wherein measuring the one or more properties of the label side of the optical disc with the opto-mechanical system comprises employing dynamic light-media interaction calibration (DLMIC).

4. The method of claim 1, wherein measuring the one or more properties of the label side of the optical disc comprises using a satellite detector.

5. The method of claim 1, wherein measuring the one or more properties of the label side of the optical disc comprises using an auto-focus sensor.

6. The method of claim 1, wherein adjusting the opto-mechanical system comprises adjusting at least one of an exposure time of a laser of the opto-mechanical system, an applied power of the laser of the opto-mechanical system, and focus of the laser of the opto-mechanical system.

7. The method of claim 1, wherein adjusting the opto-mechanical system comprises adjusting the opto-mechanical system in essentially real-time for variations in the label side of the optical disc as sensed.

8. A system comprising:
    a laser separated into a plurality of laser beams, each laser beam incident to a corresponding track of a label side of an optical disc;
    at least one of:
        an auto-focus sensor detecting a central beam of the plurality of laser beams incident to a current track of the label side of the optical disc;
        a satellite detector detecting a satellite beam to the central beam of the plurality of laser beams incident to a previous track to the current track of the label side of the optical disc; and,
    a controller to adjust the laser based on at least one of the central beam as detected and the satellite beam as detected for future writing on the label side of the optical disc.

9. The system of claim 8, further comprising:
    a diffraction grating to separate the laser into the plurality of laser beams;
    a collimator lens to collimate the plurality of laser beams;
    an objective lens to focus each of the plurality of laser beams as collimated onto the corresponding track of the label side of the optical disc;
    a multi-beam detector array including the at least one of the auto-focus sensor and the satellite detector;
    a beam splitter to direct the plurality of laser beams returning from the label side of the optical disc towards the multi-beam detector array; and,
    a lens to collimate the plurality of laser beams as directed by the beam splitter to the multi-beam detector array.

10. The system of claim 8, wherein the auto-focus sensor and the controller provide for dynamic light-media interaction calibration (DLMIC) of the laser.

11. The system of claim 8, wherein the satellite detector and the controller provide for light-media interaction calibration (LMIC) of the laser.

12. The system of claim 8, wherein the controller, based on the at least one of the central beam as detected and the satellite beam as detected, determines at least one of: label side reflectivity; label side contrast; label side gray level; label side response linearity; written mark spot size; and, written mark spot shape.

13. The system of claim 8, wherein the controller adjusts at least one of an exposure time of the laser, an applied power of the laser, and focus of the laser.

14. The system of claim 8, wherein the system is encased in an enclosure internally connectable to a computer.

15. The system of claim 8, wherein system is encased in an enclosure externally connectable to a computer.

16. The system of claim 8, wherein the system is part of a computer.

17. A system comprising:
    a laser for at least writing on a label side of an optical disc;
    at least one of:
        means for performing light-media interaction calibration (LMIC) of the laser, the LMIC sensing a mark one track after the mark was laser-written on the label side of the optical disc, the means comprising a satellite detector sensing a satellite laser beam incident to a previous track to the current track to which a central laser beam is incident; and,
        means for performing dynamic LMIC (DLMIC) of the laser, the DLMIC sensing a current track of the label side of the optical disc as the current track of the label side of the optical disc is laser-written to,
    wherein at least one of the means for performing LMIC and the means for performing DLMIC measures one or more properties of the label side of the optical disc.

18. The system of claim 17, wherein the means for performing DLMIC comprises an auto-focus sensor sensing a central laser beam incident to the current track.

19. The system of claim 17, wherein at least one of the means for performing LMIC and the means for performing DLMIC determines at least one of: label side reflectivity; label side contrast; label side gray level; label side response linearity; written mark spot size; and, written mark spot shape.

20. The system of claim 17, wherein at least one of the means for performing LMIC and the means for performing DLMIC adjusts at least one: of an exposure time of a laser, an applied power of the laser, and a focus spot size of the laser.

21. The system of claim 17, wherein the system is encased in an enclosure internally connectable to a computer.

22. The system of claim 17, wherein system is encased in an enclosure externally connectable to a computer.

23. The system of claim 17, wherein the system is part of a computer.

24. A computer-readable medium having a computer program stored thereon for performing a method comprising:

rotating an optical disc;
moving a laser to a current track of a label side of the optical disc;
separating the laser into at least a central beam incident to the current track and a satellite beam incident to a previous track to the current track of the label side of the optical disc;
writing a mark to the current track of the label side of the optical disc with the central beam;
moving the laser to a next track to the current track of the label side of the optical disc, such that the central beam becomes incident to the next track and the satellite beam becomes incident to the current track;
sensing the mark on the current track with the satellite beam; and,
adjusting the laser based on the mark on the current track as sensed with the satellite beam for future writing on the label side of the optical disc.

25. The medium of claim 24, the method further comprising, after sensing the mark, detecting the satellite beam with a satellite detector.

26. The medium of claim 24, wherein sensing the mark and adjusting the laser based on the mark constitute performing light-media interaction calibration (LMIC).

27. The medium of claim 24, wherein sensing the mark on the current track comprises sensing at least one of: label side reflectivity; label side contrast; label side gray level; label side response linearity; written mark spot size; and, written mark spot shape.

28. The medium of claim 24, wherein adjusting the laser comprising adjusting at least one of: an exposure time of the laser, an applied power of the laser, and a focus spot size of the laser.

29. A computer-readable medium having a computer program stored thereon for performing a method comprising:

rotating an optical disc;
moving a laser such that a central beam thereof is incident to a current track of a label side of the optical disc, the central beam responsible for writing to the label side of the optical disc;
sensing the current track of the label side of the optical disc with the central beam, including measuring at least one of: label side reflectivity; label side contrast; label side gray level; label side response linearity; written mark spot size; and, written mark spot shape; and,
adjusting the laser based on the current track as sensed with the central beam for future writing on the label side of the optical disc.

30. The medium of claim 29, the method further comprising, after rotating the optical disc, separating the laser into at least the central beam.

31. The medium of claim 29, the method further comprising, after sensing the current track, detecting the central beam with an auto-focus sensor.

32. The medium of claim 29, wherein sensing the current track and adjusting the laser based on the current track constitute performing dynamic light-media interaction calibration (DLMIC).

33. The medium of claim 29, wherein adjusting the laser comprising adjusting at least one: of an exposure time of the laser, an applied power of the laser, and focus spot size of the laser.

34. A computer-readable medium having a computer program stored thereon to perform a method comprising:

performing light-media interaction calibration (LMIC) of a laser for at least writing on a label side of an optical disc, the LMIC sensing a mark one track after the mark was laser-written on the label side of the optical disc; and,
performing dynamic LMIC (DLMIC) of the laser, the DLMIC sensing a current track of the label side of the optical disc as the current track of the label side of the optical disc is laser-written to,
wherein at least one the method for performing LMLC and the method for performing DLMIC measures one or more properties of the label side of the optical disc, and determines at least one of: label side reflectivity; label side contrast; label side gray level; label side response linearity; written mark spot size; and, written mark spot shape.

35. The medium of claim 34, wherein at least one of the method for performing LMIC and the method for performing DLMIC adjusts at least one of an exposure time of a laser and an applied power of the laser.

* * * * *

UNITED STATES PATENT AND TRADEMARK OFFICE
CERTIFICATE OF CORRECTION

PATENT NO. : 7,187,637 B2 Page 1 of 1
APPLICATION NO. : 10/123581
DATED : March 6, 2007
INVENTOR(S) : Michael A. Pate et al.

It is certified that error appears in the above-identified patent and that said Letters Patent is hereby corrected as shown below:

In column 10, line 43, in Claim 34, after "one" insert -- of --.

In column 10, line 43, in Claim 34, delete "LMLC" and insert -- LMIC --, therefor.

Signed and Sealed this

Eighteenth Day of August, 2009

David J. Kappos
*Director of the United States Patent and Trademark Office*